United States Patent
Capelle et al.

(10) Patent No.: US 6,426,052 B1
(45) Date of Patent: *Jul. 30, 2002

(54) VESSEL FOR REGENERATING A CATALYST FOR THE PRODUCTION OF AROMATIC COMPOUNDS OR FOR REFORMING, WITH IMPROVED OXYCHLORINATION

(75) Inventors: Marianne Capelle, Ternay; Jean-Marie Deves, Vernouillet; Frédéric Hoffmann, Paris; Michel Thery, Vernaison, all of (FR)

(73) Assignee: Institut Francais du Petrole (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/627,075

(22) Filed: Jul. 27, 2000

Related U.S. Application Data

(62) Division of application No. 09/059,293, filed on Apr. 14, 1998, now Pat. No. 6,133,183.

(30) Foreign Application Priority Data

Apr. 14, 1997 (FR) .............................................. 97 04662

(51) Int. Cl.$^7$ .............................. B01J 38/44; B01J 38/12
(52) U.S. Cl. ........................ 422/178; 422/172; 422/173; 422/198; 422/223
(58) Field of Search ................................ 422/171, 172, 422/173, 198, 178, 223

(56) References Cited

U.S. PATENT DOCUMENTS

| | | | |
|---|---|---|---|
| 2,344,770 A | 3/1944 | Gunness | 422/223 |
| 2,391,327 A | 12/1945 | Meckler | 502/52 |
| 2,487,717 A | 11/1949 | Maker et al. | 422/223 |
| 3,652,231 A | 3/1972 | Greenwood et al. | 422/223 |
| 4,007,131 A | 2/1977 | Gillespie | 208/108 |
| 4,849,092 A | 7/1989 | Ham | 208/140 |
| 4,872,970 A | 10/1989 | Boyle | 208/140 |
| 4,977,119 A | 12/1990 | Koves | 502/48 |
| 4,980,325 A | 12/1990 | Sechrist | 422/216 |
| 5,034,117 A | 7/1991 | Debonneville et al. | 422/216 |
| 5,053,371 A | 10/1991 | Williamson | 502/37 |

FOREIGN PATENT DOCUMENTS

| | | |
|---|---|---|
| EP | 0 258 137 | 3/1988 |
| EP | 0 378 482 | 7/1990 |
| FR | 2 642 330 | 8/1990 |
| GB | 2 228 426 | 8/1990 |

*Primary Examiner*—Hien Tran
(74) *Attorney, Agent, or Firm*—Millen, White, Zelano & Branigan, P.C.

(57) ABSTRACT

A vessel for regenerating a catalyst for reforming or for aromatic compound production comprising a support, at least one noble metal and chlorine, the catalyst being in the form of a moving bed, said vessel comprising at least one combustion zone (A) provided with at least one conduit (9) for introducing oxygen gas and at least one conduit (5) for evacuating gasses from the combustion step, at least one oxychlorination zone (B) and at least one calcining zone (C) provided with at least one conduit (18) for introducing an oxygen-containing gas, said vessel also comprising at least one conduit (1) for introducing catalyst into the vessel, at least one conduit (3) for introducing catalyst from the combustion zone into the following oxychlorination zone (B), and at least one conduit (21) for evacuating gases from the oxychlorination zone comprising at least one means (20) for introducing least one chlorinating agent and at least one means (19) for introducing water and at least one means (17) for introducing an oxygen containing gas.

18 Claims, 1 Drawing Sheet

VESSEL FOR REGENERATING A CATALYST FOR THE PRODUCTION OF AROMATIC COMPOUNDS OR FOR REFORMING, WITH IMPROVED OXYCHLORINATION

This is a division of application Ser. No. 09/059,293 filed Apr. 14, 1998, now U.S. Pat. No. 6,133,183.

FIELD OF THE INVENTION

The invention relates to apparatus for moving bed or fixed bed processes for the production of aromatic compounds, in particular for reforming. More particularly, it concerns the oxychlorination step during regeneration of a used catalyst and is intended to restore its initial catalytic performances.

BACKGROUND OF THE INVENTION

The catalyst generally comprises a support (for example, formed from at least one refractory oxide, the support possibly also including one or more zeolites), at least one noble metal (preferably platinum), and preferably at least one promoter metal (for example tin or rhenium), at least one halogen and optionally one or more additional elements (such as alkalis, alkaline-earths, lanthanides, silicon, group IVB elements, non noble metals, group IIIA elements, etc.). Catalysts of this type contain platinum, for example, and at least one other metal deposited on a chlorinated alumina support. In general, such catalysts are used to convert naphthenic or paraffinic hydrocarbons, which can be transformed by dehydrocyclisation and/or dehydrogenation, for reforming or for the production of aromatic compounds (for example for the production of benzene, toluene, orthoneta- or para-xylenes). Such hydrocarbons originate from fractionation of crude oil by distillation or other transformation processes.

Such catalysts have been widely described in the literature.

One way of increasing the yields of such reforming or aromatic compound production processes is to reduce the operating pressures at which the different reactions of interest are carried out. As an example, reforming reactions were carried out at 40 bars 30 years ago; 20 years ago, at 15 bars. Today, reforming reactors usually operate at pressures of less than 10 bars, in particular in the range 3 to 8 bars.

The improvement in desirable reactions due to a reduction in pressure is accompanied by more rapid deactivation of the catalyst by coking. Coke, a high molecular weight compound constituted essentially by carbon and hydrogen, is deposited on the active sites of the catalyst. The H/C molar ratio of the coke formed varies from about 0.3 to 1.0. The carbon and hydrogen atoms form condensed polyaromatic structures with a variable degree of crystalline organisation, depending on the function and nature of the catalyst and the operating conditions of the reactors. While the selectivity of transformation of the hydrocarbons to coke is very low, the amounts of coke accumulated on the catalyst can be large. Typically, for fixed bed units, such amounts are in the range 2.0% to 20.0% to 25.5% by weight. For circulating bed units, such amounts are below 10.0% by weight.

Coke deposition, which is more rapid at low pressure, also requires more rapid regeneration of the catalyst. Current regeneration cycles have become as short as 2–3 days.

Our European patent EP-A-0 378 482 discloses a continuous process for regenerating a reforming or aromatic compound production catalyst which can overcome the inherent disadvantages of shorter and shorter cycles. One of the regeneration steps is oxychlorination of the catalyst. The present invention concerns this step.

In EP-A-0 378 482, the used catalyst slowly travels from top to bottom in a regeneration vessel where it meets, in succession, a first radial moving bed combustion zone, a second radial moving bed combustion zone, an axial moving bed oxychlorination zone and an axial moving bed calcining zone, and:

a) in the first combustion zone, the catalyst is treated at a pressure of 3 to 8 bars, substantially equal to that in the first reforming reactor, at a temperature in the range 350° C. to 450° C., using a combustion gas based on an inert gas circulating as a co-current to the catalyst, comprising 0.01% to 1% of oxygen by volume, the combustion gas originating from a zone for washing the gases from the combustion, oxychlorination and calcining steps;

b) in a second combustion zone, the catalyst is treated at a pressure of 3 to 8 bars, substantially equal to that in the first reactor, at a temperature which is higher by at least 20° C. than the temperature in the first combustion zone, in the presence of gases originating from the first combustion zone and in the presence of an inert makeup gas to which up to 20% by volume of oxygen is added so that the catalyst is in contact with a gas comprising 0.01% to 1% by volume of oxygen, the gases circulating as a co-current with the catalyst;

c) the burn gases are evacuated from the second combustion zone and sent to a washing circuit after first being mixed with the gases extracted from the oxychlorination zone and the calcining zone;

d) in the axial oxychlorination zone, the catalyst is treated with a co-current of a mixture of a gas originating from the calcining zone and the chlorinated gas for 30 min to 60 min, the mixture forming an oxychlorination gas comprising 4% to 10% by volume of oxygen, at a pressure of 3 to 8 bars; the water content is of the order of 500–7000 ppm, with no added water, it originates from the gas from the combustion step, which has been washed and dried and used in part for oxychlorination, but also essentially for calcining;

e) in the axial calcining zone, the catalyst is treated for 45 min to 80 min in a counter-current at between 350° C. and 550° C. at a pressure in the range 3 to 8 bars, using a portion of the gas originating from the washing circuit and a drying zone, the gas not containing more than 100 ppm of water.

A number of patents concern the regeneration of such existing catalysts, in particular U.S. Pat. Nos. 4,980,325 and 5,053,371. In those patents, the oxychlorination and combustion zones are separate so as to allow the catalyst to pass but not gas, and there is a circuit for recycling the gases from the oxychlorination step. U.S. Pat. No. 5,053,371 describes the operating conditions: 3–25% of oxygen in the gas introduced into the oxychlorination step, a chlorine content in the oxychlorination zone of the order of 500 ppm molar and a low water content which originates from the catalyst and gas from the calcining step. in U.S. Pat. No. 4,980,325, the oxygen originates solely from the oxygen-enriched gas which is introduced to the calcining step.

We have established that while they re-introduce chlorine into the catalyst, those operating conditions for the oxychlorination step, do not ensure correct re-dispersion of the bimetallic phase. This results in a degradation of the catalytic action over time.

Thus, a gas management which could precisely control the operating conditions of the oxychlorination step and preferably also those of the oxychlorination step was researched.

The process and unit of the invention satisfy these objectives.

More precisely, the process of the invention is a process for regenerating a catalyst for aromatic hydrocarbon production or for reforming, the catalyst comprising a support, at least one noble metal and chlorine, the process comprising successive combustion, oxychlorination and calcining steps, in which process at least one chlorinating agent, at least one oxygen-containing gas and water are introduced into the oxychlorination step, such that the $H_2O/HCl$ molar ratio is 3 to 50, the oxychlorination step being carried out in the presence of an oxychlorination gas containing less than 21% of oxygen and at least 50 ppm by weight of chlorine (based on HCl), at a temperature of 350–600° C., preferably 350–550° C.

The process can be carried out in a fixed bed (the steps are then carried out successively in the same zone) or in a moving bed or with intermittent flow of the catalyst (in this case, each step is carried out in at least one different zone, the catalyst flowing from one zone to the other).

Regeneration starts with a step for combustion of the carbonized material. It is followed by an oxychlorination step then by a calcining step.

In general, the gases from the combustion step and the gases from the oxychlorination step are separately extracted from the regeneration process. In order to prevent the gases from mixing, a plate or other means is advantageously positioned so as to separate the combustion and oxychlorination zones in moving bed processes. In contrast, in these moving bed processes, gases from the calcining step can generally pass freely into the oxychlorination zone.

Whether the process is carried out in a fixed or moving bed, the catalyst which has undergone the combustion step is ready to undergo an oxychlorination step. It is carried out in one or more zones, of axial or radial type. At least one chlorinating agent, at least one oxygen-containing gas and water are introduced into the oxychlorination zone. The chlorinating agent can be chlorine, HCl, or a halogenated hydrocarbon containing less than 4 carbon atoms and 1 to 6 chlorine atoms (for example $CCl_4$) or any chlorinating agent which is known to liberate chlorine in these regeneration processes. It is preferably introduced with the oxygen-containing gas. In moving bed processes, it is advantageously introduced into the lower portion of the oxychlorination zone so that it flows as a counter-current to the catalyst, when the oxychlorination zone is axial.

The quantity of chlorinating agent introduced is such that the chlorine concentration (based on HCl) in the gas in contact with the catalyst in the oxychlorination zone, termed the oxychlorination gas (i.e., for moving bed processes, the gas introduced into the oxychlorination zone+the gas originating from the calcining zone), is at least 50 ppm by weight, in general 50–8000 ppm by weight, advantageously more than 650 ppm by weight, and preferably in the range 1000 to 8000 ppm by weight. For technical reasons (linked to corrosion, for example, or to the subsequent treatment of the chlorinated gases), it is also preferable to operate with contents which do not exceed 4000 or 5000 ppm by weight.

At least one oxygen-containing gas is also introduced into the oxychlorination zone. This gas advantageously contains a portion of the gases from the combustion step, preferably washed and dried, with additional makeup oxygen, for example air. In moving bed processes with an axial oxychlorination zone, this gas preferably circulates as a counter-current to the catalyst.

In the oxychlorination zone, the catalyst is in contact with the gas introduced and also, for moving beds, in contact with gas originating from the calcining zone, charged again with oxygen and containing a little water from the calcining step. The oxygen content of the oxychlorination gas is below 21% (by volume). It is generally above 10% by volume.

It can be seen that in the invention, in a preferred moving bed process, and in contrast to the prior art EP-A-0 378 482, at least one oxygen-containing gas is introduced into the oxychlorination step (the axial oxychlorination zone, for example), independently of the oxygen-containing gas introduced into the calcining step (the axial calcining zone, for example).

Without departing from the scope of the invention, it is also possible for moving bed processes to introduce into the oxychlorination step only chlorinating agent and water, in which case good distribution of chlorine and water is more difficult to achieve, the oxygen-containing gas then originating only from the calcining zone.

In a novel advance over EP-A-0 378 482, water is introduced into the oxychlorination step. It is advantageously supplied as a mixture with the oxygen-containing gas introduced.

The quantity of water introduced is in an $H_2O/HCl$ molar ratio of 3 to 50, preferably 4 to 50, or 4 to 30, advantageously 7 to 50, and more preferably 7 to 30. Water is supplied in liquid form or, as is preferable, as steam.

The oxychlorination gas is thus highly charged with water, and its water content is over 7000 ppm, generally at least 8000 ppm or even 10000 ppm by weight, preferably over 10000 ppm by weight.

The noble metal is re-dispersed in the presence of oxygen, chlorine and water under the described conditions, and at temperatures of 350–600° C., preferably 350–550° C. in the oxychlorination step, but usually at least 450° C., preferably between 490° C. and 530° C. The residence time of the catalyst in the oxychlorination step is normally less than 2 hours and is generally between 45 min and 2 hours.

The pressure in this zone must be balanced with the pressures in the adjacent zones when the catalyst is circulated, and at 3–8 bars for moving bed processes for catalyst regeneration operating in low pressure reforming processes.

In a preferred implementation of a moving bed process, the oxychlorination gas results from mixing the gas originating from the zone in which the calcining step is carried out with the chlorinating agent(s), water and the oxygen-containing gas(es) introduced into the zone in which the oxychlorination step is carried out, the oxygen-containing gas(es) comprising a portion of the gases from the combustion step with an additional oxygen makeup, and the gas introduced into the calcining zone is air or a gas formed from a portion of the gases from the combustion step which have been washed, dried and had an oxygen makeup.

In these moving bed processes, the oxychlorination gas also contains gas originating from the calcining zone; an oxygen-containing gas is introduced into this calcining zone, also less than 1 mole % of water, preferably less than 0.1% of water and more preferably less than 0.05% of water. In general, the water content will be below 150 ppm molar, preferably less than 100 ppm molar and advantageously less than 50 ppm molar.

The oxygen-containing gas can be air. Advantageously, this gas comprises a portion of the gas from the combustion step, which has been washed and dried, with an addition of oxygen (air). In this advantageous case, the oxygen content in the gas introduced into the calcining step is less than 21% by volume. In general, the oxygen content of the gas introduced into the calcining step is at most 21% by volume.

As is known, the temperature of the calcining step is in the range 350° C. to 600° C., preferably 350–550° C. The oxygen-containing gas circulates as a counter-current to the catalyst in moving bed processes with an axial calcining zone. In general, the residence time is less than 1 hour.

In order to strictly control the operating conditions in the oxychlorination zone, it is preferable to operate without recycling the oxychlorination gases.

The absence of recycling also enables the oxygen content to be more precisely controlled, and means that high oxygen contents (no dilution) can economically be obtained.

However, some implementations may include recycling.

In the absence of recycling (preferred case), the oxychlorination gas (or the purge of this gas if it is recycled) leaving the oxychlorination zone is discharged from the unit (for example into the atmosphere) after treatment to eliminate at least the chlorinated impurities.

It is also important to dry the gas supplied to the oxychlorination zone from the combustion step, when this is the case, to control the quantity of water present in the oxychlorination gas using the quantity of water added. The gas extracted from the combustion step can be dried before it is fractionated to supply a portion to the oxychlorination zone, or the fractionated portion can be dried. The air is also preferably dried.

Under the conditions of the process of the invention, a considerable improvement in re-dispersion of the metallic phase of the catalyst is obtained with respect to the prior art, as will be shown in the example.

The state of dispersion of the metallic phase of the catalyst is quantitatively determined by $H_2/O_2$ chemisorption.

The invention also concerns a vessel for carrying out the process of the invention.

SUMMARY OF THE APPARATUS ASPECT OF THE INVENTION

The vessel of the invention is a vessel for regenerating a catalyst for reforming or for aromatic compound production comprising a support, at least one noble metal and chlorine, the catalyst being in the form of a moving bed, said vessel comprising at least one combustion zone (A) provided with at least one conduit (9) for introducing oxygen-containing gas and at least one conduit (5) for evacuating gases from the combustion step, at least one oxychlorination zone (B) and at least one calcining zone (C) provided with at least one conduit (18) for introducing an oxygen-containing gas, said vessel also comprising at least one conduit (1) for introducing catalyst into the vessel, at least one conduit (3) for introducing catalyst from the combustion zone into the following oxychlorination zone (B), and at least one conduit (21) for evacuating gases from the oxychlorination step, the vessel being characterized in that the oxychlorination zone comprises at least one means (19) for introducing at least one chlorinating agent and at least one means (20) for introducing water and at least one means (17) for introducing an oxygen-containing gas.

DETAILED DESCRIPTION OF THE FIGURES

Figure 1:
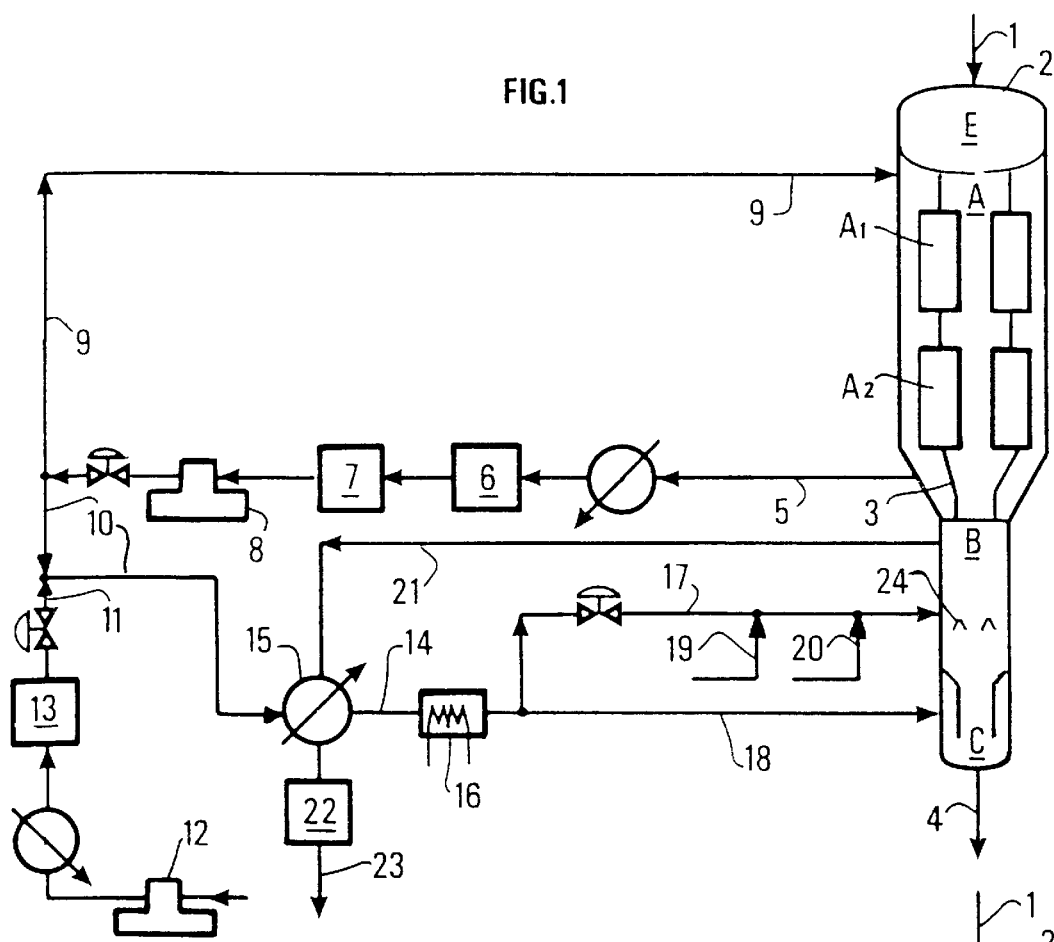
FIGS. 1 and 2 show two embodiments of the invention.

The invention will be described with reference to FIG. 1 showing a preferred embodiment of the invention.

The catalyst circulates continuously in the regenerator, its path being as follows: used catalyst entering into the regenerator via a conduit (1) at the top of the vessel (E) passes into a buffer zone (2) then drops under gravity into combustion zones (A1) (A2) in which the combustion step is carried out. The number of combustion zones is of little importance to the invention. One combustion zone (A) is sufficient.

After combustion, the catalyst with a low carbonized material content arrives in the oxychlorination zone (B) passing through conduits or shafts (3). Then it flows into calcining zone (C) and leaves the vessel via conduits (4).

FIG. 1 shows one oxychlorination zone and one calcining zone, but a plurality are possible. These zones are very advantageously axial in type.

Between the combustion and oxychlorination zones, a plate or any other zone separation means is advantageously positioned to allow the catalyst to pass but not the gases.

In contrast, gas circulates freely from the calcining zone to the oxychlorination zone. In FIG. 1, a single bed of catalyst is provided for calcining and oxychlorination. The invention can use distinct beds with circulation of gas and of catalyst.

The combustion gases are evacuated via at least one conduit (5) which opens into washing zone (6). The gases are washed then dried in a drier (7), purged if necessary then compressed in a compressor (8). A portion of these gases is recycled via conduit (9) to combustion zone(s) (A) after adding oxygen, while the other portion of gases passes via conduit (10).

A makeup of dry oxygen (drier (13) preceded by a chiller) is added to the gas in conduit (10) via a conduit (11) connected to a compressor (12) which ensures a flow of air, for example, regulated by means of a valve, depending on the amount of oxygen required in the gas. An oxygen-containing gas is obtained in conduit (14). The gas is advantageously pre-heated in exchanger (15) before passing into an oven (16).

In the implementation shown in FIG. 1, a portion of this gas directly supplies the oxychlorination zone via conduit (17), while the other portion supplies the calcining zone via conduit (18). Gas is injected into the oxychlorination zone after adding a controlled quantity of steam via at least one conduit (20) and a controlled quantity of chlorinating agent via at least one conduit (19).

Conduits (17) and (18) arrive in the lower portion of each of the axial zones to produce a gas-solid counter-current. At conduit (17), at least one deflector (24) is advantageously located in the catalytic bed to distribute the gases properly. The gas is evacuated from the oxychlorination zone via conduit (21), advantageously passing into exchanger (15) before being routed into a washing zone (22). The washed gas can then be discharged into the atmosphere via conduit (23) or, more generally, evacuated from the unit.

A conduit (18) connected to conduit (14) is preferably provided to supply the oxygen-containing gas to the calcining zone. Conduit (18) is preferably located after oven (16). It can be seen that in the case of FIG. 1, the gases introduced via conduits (17) and (18) have substantially the same oxygen content.

FIG. 1 shows an optimised arrangement of the gases using the gases from the combustion zone in the calcining zone. Dry, heated air could just as easily be directly supplied to the calcining zone, i.e., without fractionating the gas re-heated in oven (16). Thus at least a portion of this gas is sent to the oxychlorination zone.

Figure 2:
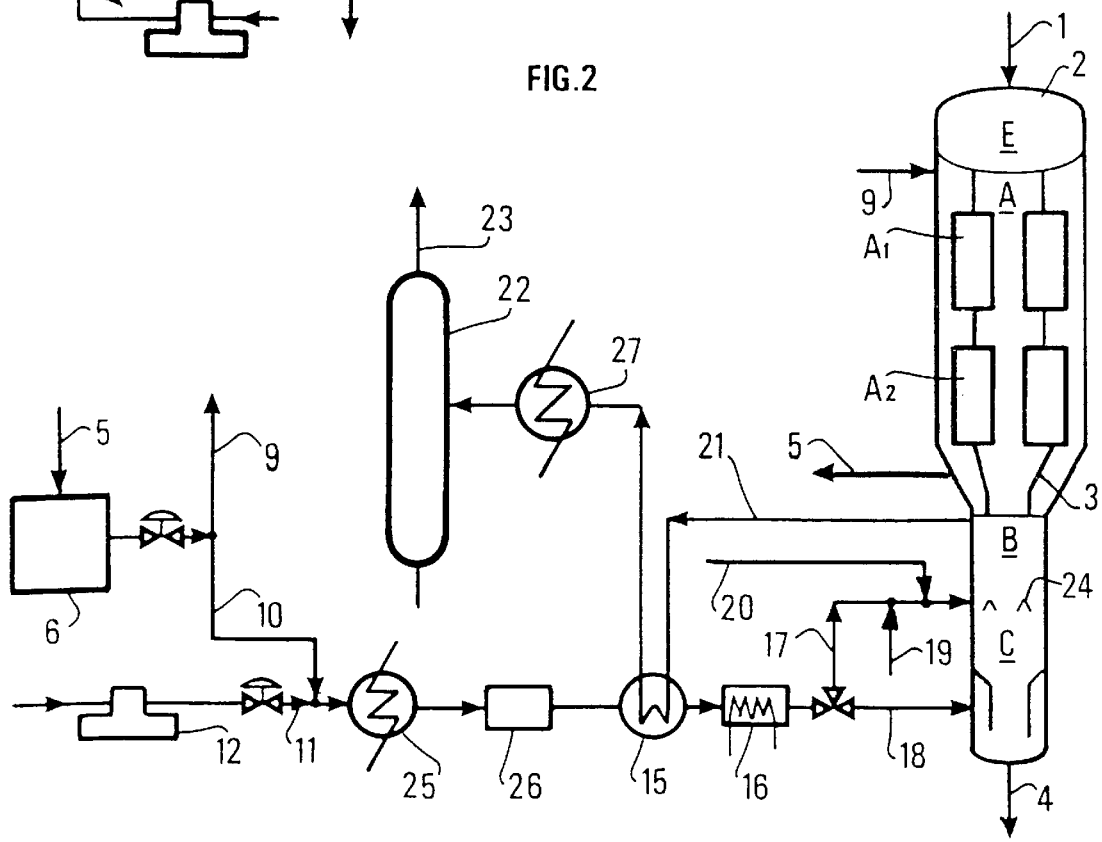

FIG. 2 shows a further implementation which is distinguished from that of FIG. 1 by the equipment placed in the conduits (driers, ovens, exchangers . . . ).

This figure is given to illustrate the possibility of varying the arrangement of equipment and conduits within the scope of the invention.

Conduit (5) for evacuating gas from the combustion step leads into a washing drum (6). After washing, the gas is fractionated into a portion which returns to the combustion zone via a conduit (9) (the equipment in this conduit is not shown). Compressed oxygen (air) (compressor (12)) supplied via conduit (11)) is added to the other portion evacuated via conduit (10).

The oxygen-charged gas passes into exchanger (25), a drier (26), an exchanger (15) and an oven (16). After re-heating, the gas is divided into a stream leaving via a conduit (17) towards the oxychlorination zone with an addition of chlorinating agent via conduit (19) and water via conduit (20). The other stream goes to the calcining zone via conduit (18).

The effluent from the oxychlorination zone is evacuated via conduit (21), passes into exchanger (15), a chiller (27), and a washing drum or washing zone (22), and is discharged into the atmosphere via conduit (23).

Thus in these embodiments, conduit (5) for evacuating the gases from the combustion step opens into a washing zone (6) for the gases, and a conduit (9) recycles a portion of the washed gases to the combustion zone(s), a conduit (10) leads away a further portion of the washed gas which, with additional oxygen-containing gas supplied via a conduit (11), produces an oxygen-containing gas at least a portion of which is introduced into oxychlorination zone (B) via a conduit (17).

To introduce a homogeneous gas, it is preferred that at least one conduit (19) supplying at least one chlorinating agent and a conduit (20) supplying water lead into conduit (17), so that a gas comprising water, at least one chlorinating agent and oxygen enter the oxychlorination zone via conduit (17).

It should be noted that the embodiments shown do not include recycling of the oxychlorination gases. The importance of the invention will be clear from the following example.

EXAMPLE

A flow of 800 kg/h of catalyst can contain 6.25% of coke. Combustion requires a circuit of 16000 kg/h of gas and a purge of about 700 kg/h, entirely used for calcining and oxychlorination. The purge gas and air will form a 3100 kg/h calcining and oxychlorination gas containing 17% by volume of oxygen. The oxygen and the purge gas are first dried to obtain a mass fraction of $H_2O$ of less than 50 ppm molar. The gas is separated into two portions: 1550 kg/h via the conduit at the bottom of the calcining zone and 1550 kg/h is injected into the bottom of the oxychlorination zone after adding the chlorinating agent and steam into that conduit. A flow of chlorinating agent which corresponds to 12 kg/h of chlorinating agent and 60 kg/h of steam is injected, as an example. The catalyst stays in the oxychlorination zone for 1.5 hours and in the calcining zone for 0.5 hours. The effectiveness of the oxychlorination treatment is evaluated by comparing the state of the dispersion of the metallic phase in samples of catalyst removed from the calcining zone outlet. The state of the dispersion of the metallic phase of the catalyst is quantitatively determined by $H_2/O_2$ chemisorption. The results obtained show that the dispersion of the metallic phase of samples removed from the calcining step outlet is 18% higher on average of that of samples removed from the oxychlorination step inlet. The chlorine content of samples of catalyst removed from the outlet is 1.10% by weight.

What is claimed is:

1. A vessel for regenerating a catalyst for reforming or for aromatic compound production comprising a support, at least one noble metal and chlorine, the catalyst being in the form of a moving bed, said vessel comprising at least one combustion zone (A) provided with at least one conduit (9) for introducing oxygen-containing gas and at least one conduit (5) for evacuating gases from the combustion zone, at least one oxychlorination zone (B) and at least one calcining zone (C) below the oxychlorination zone and provided with at least one conduit (18) for introducing an oxygen-containing gas into the at least one calcining zone, said vessel also comprising at least one conduit (1) for introducing catalyst into the vessel, at least one conduit (3) for introducing catalyst from the combustion zone into the following oxychlorination zone (B), and at least one conduit (21) for evacuating gases from the oxychlorination zone, the vessel being characterized in that the oxychlorination zone comprises at least one means (19) for introducing at least one chlorinating agent, and at least one means (20) for introducing water said at least one means for introducing water providing an $H_2O/HCl$ molar ratio of 3–50, and over 7000 ppm water in the oxychlorination gas and comprising a conduit and an external source of water and at least one means (17) comprising a conduit for introducing an oxygen-containing gas into the oxychlorination zone.

2. A vessel according to claim 1, wherein the conduit (5) for evacuating the gases from the combustion zone opens into a washing zone (6) for the gases, and said conduit (9) recycles a portion of the washed gases to the combustion zone(s), and further comprising a conduit (10) leading away a further portion of the washed gas which, with additional oxygen-containing gas supplied via a conduit (11), produces an oxygen-containing gas at least a portion of which is introduced into the oxychlorination zone (B) via said conduit of the means (17) for introducing an oxygen-containing gas into the oxychlorination zone.

3. A vessel according to claim 1, wherein said at least one means for introducing at least one chlorinating agent (19) and said means (20) for introducing water connect to means (17) for introducing an oxygen containing gas into the oxychlorination zone so that a gas comprising water, at least one chlorinating agent and oxygen enter the oxychlorination zone via conduit of means (17) for introducing an oxygen containing gas into the oxychlorination zone.

4. A vessel according to claim 32 further comprising an oven (16) integrated with said conduit (18).

5. A vessel according to claim 1 further comprising a drier (7) for drying gases from the combustion zone, which have been washed, a compressor (8) for the dried gas, means for recycling a portion of the compressed dried gas to the combustion zone(s) via conduit (9), and means for passing another portion of the compressed dried gas, into the oxychlorination zone (B) said means for passing comprising: a conduit (11) for adding an oxygen-containing gas to said another portion of compressed dried gas, and an oven (16), in communication with conduit of means for reheating said another portion.

6. A vessel according to claim 3 further comprising a means for fractionating gas supplied via conduit (14) from said evacuated gases from the combustion zone into a portion for introduction via conduit (17) to the oxychlorination zone (B) and a portion for introduction to calcining zone (C) via said conduit (18).

7. A vessel according to claim 1 further comprising integrated with conduit(s) (21) a zone (22) for treating the gases evacuated from the oxychlorination zone and a means (23) for evacuating said gases from said zone (22).

8. A vessel according to claim 1, wherein the calcining and oxychlorination zones are axial.

9. A vessel according to claim 8, wherein the axial calcining and oxychlorination zones form a single bed and further comprising deflectors (24) located in the bed at the level of the conduit of means (17) for introducing the gas into the oxychlorination zone.

10. A vessel according to claim 1, wherein said at least one means for introducing water provides at least 8000 ppm of water in the oxychlorination gas.

11. A vessel according to claim 1, wherein said at least one means for introducing water provides at least 10000 ppm of water in the oxychlorination gas.

12. A vessel according to claim 1, wherein said at least one means for introducing water provides over 10000 ppm of water in the oxychlorination gas.

13. A vessel according to claim 1, wherein said at least one means for introducing water provides an $H_2O/HCl$ molar ratio of 4–50.

14. A vessel according to claim 1, wherein said at least one means for introducing water provides an $H_2O/HCl$ molar ratio of 4–30.

15. A vessel according to claim 1, wherein said at least one means for introducing water provides an $H_2O/HCl$ molar ratio of 7–50.

16. A vessel according to claim 1, wherein said at least one means for introducing water provides an $H_2O/HCl$ molar ratio of 7–30.

17. A vessel according to claim 1 further comprising a drier 7 for drying gases from the combustion zone, which have been washed, a compressor (8) for the dried gas, means for recycling a portion of the compressed dried gas to the combustion zone(s) via conduit (9), and means for passing another portion of the compressed dried gas, into the oxychlorination zone (B).

18. A vessel according to claim 12, wherein said at least one means for introducing water provides an $H_2O/HCl$ molar ratio of 7–30.

* * * * *

UNITED STATES PATENT AND TRADEMARK OFFICE
CERTIFICATE OF CORRECTION

PATENT NO.     : 6,426,052 B1
DATED          : July 30, 2002
INVENTOR(S)    : Capelle et al.

It is certified that error appears in the above-identified patent and that said Letters Patent is hereby corrected as shown below:

<u>Title page,</u>
Item [57], ABSTRACT,
Line 6, after "oxygen" insert -- containing --.

<u>Column 8,</u>
Line 45, delete "32" and insert -- 1 --.
Line 56, after "means" insert -- 17 --.

Signed and Sealed this

Twenty-fifth Day of February, 2003

JAMES E. ROGAN
*Director of the United States Patent and Trademark Office*